United States Patent
Su et al.

(10) Patent No.: US 8,234,360 B2
(45) Date of Patent: Jul. 31, 2012

(54) SYSTEM FOR PROCESSING MESSAGES TO SUPPORT NETWORK TELEPHONY SERVICES

(75) Inventors: Jinyan Su, Sammamish, WA (US); Alexandru Gavrilescu, Redmond, WA (US); Mark Markaryan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1938 days.

(21) Appl. No.: 10/128,218

(22) Filed: Apr. 23, 2002

(65) Prior Publication Data

US 2003/0200298 A1 Oct. 23, 2003

(51) Int. Cl.
*G06F 15/173* (2006.01)
(52) U.S. Cl. ............ 709/223; 709/206; 710/5; 719/313
(58) Field of Classification Search .................. 709/223, 709/216, 206; 718/103; 715/744; 712/220; 379/90.01; 710/105, 5; 717/101; 719/313
See application file for complete search history.

(56) References Cited

U.S. PATENT DOCUMENTS

| | | | | |
|---|---|---|---|---|
| 3,662,401 | A * | 5/1972 | Collins et al. ............... | 718/103 |
| 4,720,850 | A * | 1/1988 | Oberlander et al. ........ | 379/90.01 |
| 5,430,836 | A * | 7/1995 | Wolf et al. .................... | 715/744 |
| 5,452,420 | A * | 9/1995 | Engdahl et al. .............. | 710/105 |
| 5,574,917 | A * | 11/1996 | Good et al. ................... | 712/220 |
| 5,625,678 | A | 4/1997 | Blomfield-Brown | |
| 6,085,233 | A * | 7/2000 | Jeffrey et al. ................. | 709/216 |
| 6,230,198 | B1 * | 5/2001 | Dawson et al. ............... | 709/224 |
| 6,314,555 | B1 * | 11/2001 | Ndumu et al. ................ | 717/101 |
| 6,343,116 | B1 | 1/2002 | Quinton et al. | |
| 6,584,185 | B1 | 6/2003 | Nixon | |
| 8,001,205 | B2 * | 8/2011 | Elvanoglu et al. ............ | 709/207 |
| 2002/0009188 | A1 | 1/2002 | Rosset et al. | |
| 2002/0120759 | A1 * | 8/2002 | Faccin et al. .................. | 709/230 |
| 2002/0163912 | A1 * | 11/2002 | Carlson ......................... | 370/392 |
| 2002/0191623 | A1 * | 12/2002 | Couturier et al. ............ | 370/401 |
| 2003/0023877 | A1 * | 1/2003 | Luther et al. .................. | 713/201 |
| 2003/0097484 | A1 | 5/2003 | Bahl | |
| 2003/0147378 | A1 | 8/2003 | Glasser et al. | |
| 2007/0189191 | A1 * | 8/2007 | Ades ............................. | 370/254 |

OTHER PUBLICATIONS

Schulzrinne, Henning, et al., "The Session Initiation Protocol: Internet-Centric Signaling", *IEEE Communications Magazine*, Oct. 2000, pp. 2-9.
Singh, Kundan, et al., "Unified Messaging Using SIP and RTSP", Oct. 11, 2000, retrieved from www.cs/columbia.edu/~library/TR-repository/reports/reports-2000/cucs-020-00/ps.qz, on Jul. 8, 2004, pp. 1-16.
Wedlund, Elin, "Mobility Support Using SIP", *ACM/IEEE International Conference on Wireless and Multimedia (WoWMoM)*, Seattle, Washington (Aug. 1999) pp. 76-82.

(Continued)

*Primary Examiner* — Douglas Blair
*Assistant Examiner* — Oleg Survillo
(74) *Attorney, Agent, or Firm* — Perkins Coie LLP

(57) ABSTRACT

A system for conveniently extending the capabilities of network systems to support telephony is presented. Also, a method and system for preventing message looping within network devices that support telephony is presented. A network system, such as a proxy server, executes one or more executable service modules having instructions for performing a specific telephony service. A dispatcher operating upon the network device dispatches messages to the service modules according to a set of resource data provided by the service modules. To prevent message looping, the dispatcher executes logical instructions that restrict the service modules from routing messages to each other indefinitely.

13 Claims, 7 Drawing Sheets

OTHER PUBLICATIONS

Handley, et al., "SIP:Session Initiation Protocol", Internet Engineering Task Force, May 29, 2001 retrieved from www.cs.columbia.edu/sip/drafts/draft-ietf-sip-rfc2543bis-03.pdf on Jul. 8, 2004 (139 pages).

* cited by examiner

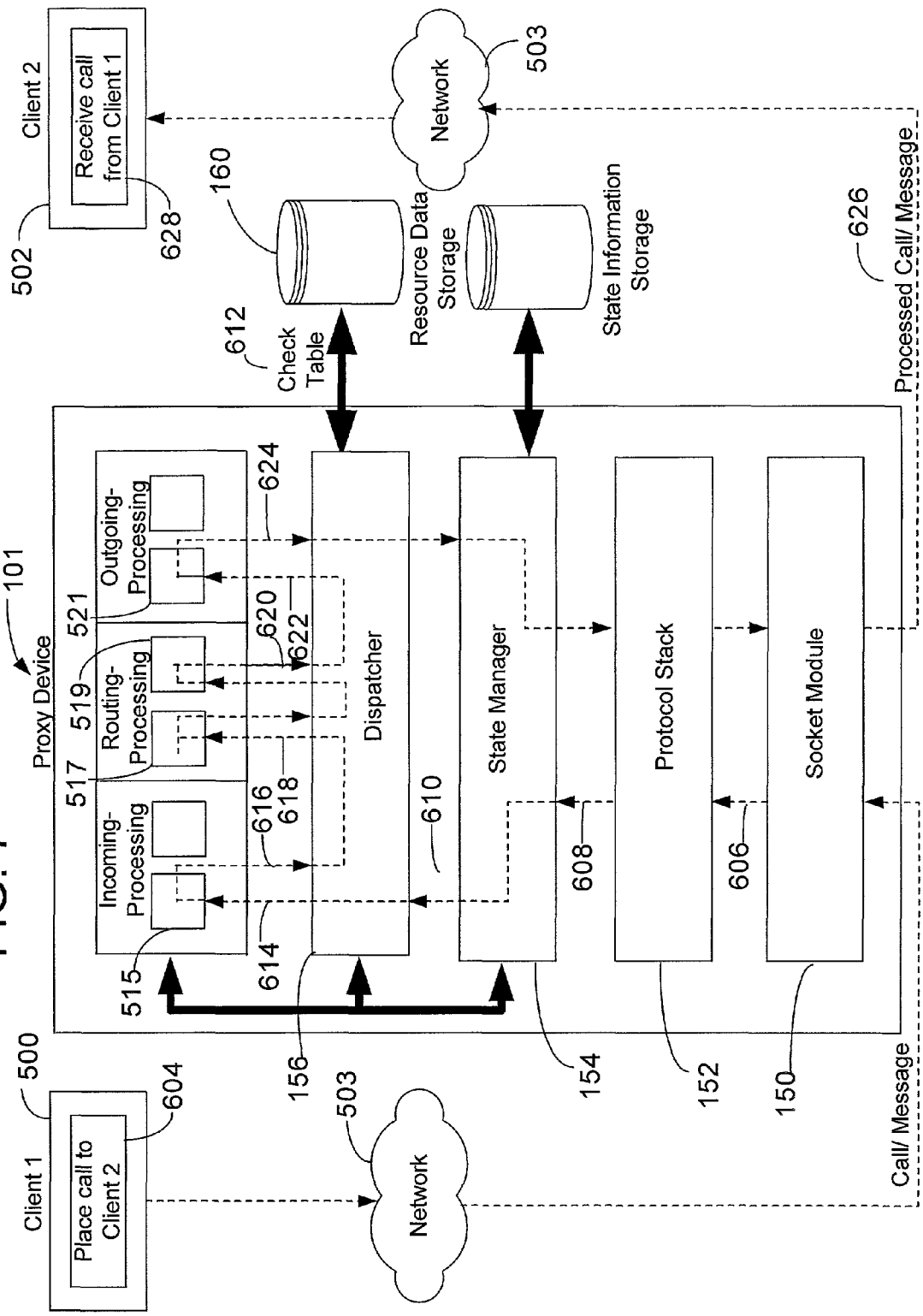

SYSTEM FOR PROCESSING MESSAGES TO SUPPORT NETWORK TELEPHONY SERVICES

TECHNICAL FIELD

The invention relates generally to communication between computers over a network, and more particularly, to enabling extended telephony services to be provided for supporting communication between computers.

BACKGROUND OF THE INVENTION

With today's widespread use of the Internet as a primary communication medium, many standard communication tools are now capable of communicating over a network. For instance, telephones, pagers, cell phones, handheld computers, and even fax machines now offer features to allow them to be accessed and controlled from over the Internet via an IP address designation or other network addressing scheme. As a result, these devices have the ability to communicate with each other remotely from over the network to share information, or receive data. Now it is possible for a text message to be transmitted by a user of a handheld device to a fax machine or printer belonging to another user, all from over the network. Furthermore, a user having several communication devices (e.g., a cell phone, laptop and handheld PC) can configure each of these devices to the network using a single alias or identifier, such as a username (e.g., username@b.com). In this way, the user's many devices need not be configured separately onto the network, making them easier to manage and access.

To support network telephony services such as those described above, a common protocol known as the Session Initiation Protocol (SIP) is often used to facilitate the communication. SIP is a text-based, peer-to-peer network protocol designed to provide telephony and voice over IP (VoIP) services over a network connection. It can be used to establish, maintain, and terminate calls, or sessions, between two or more device users. Typically, SIP is enabled with an SIP server, which can act as a proxy server that intermediates a call. As such, when the user of a first device places a call or requests a session with a second device user via the network, the proxy server receives (intercepts) the message in the form of an SIP request, processes it, and forwards the message to the second device. The processing that takes place includes standard SIP functions such as determining the location of the user of the second device, determining if there are other devices associated with the same user, and verifying the availability of the second device to receive calls. Other more advanced services are also capable of being performed such as call routing and forwarding, authentication, device or call request retransmission, and network security and access control. Typically, a dedicated server that is separate from the proxy server performs these more advanced services. The dedicated server has specific instructions for performing a particular service, and can communicate directly with the proxy server during the handling of a call.

The usage of dedicated servers for providing various services during a call does have a few drawbacks. One drawback is that the introduction of a dedicated server for performing a service requires extra network resources to be expended in order to complete the call. Rather than directly communicating with the second device, the first device has to communicate with the proxy server and one or more dedicated servers before it ever reaches the second device to place the call. Obviously, this places greater demand on the network, which could limit the reliability and speed at which the call is placed. Another drawback is that another server must be added to the network (such as by the network administrator of the proxy) each time a new service is to be made available. For example, to provide voicemail services, a dedicated "voicemail" server must be introduced to the existing system, which could require significant configuration and setup time. Still further, it is possible for calls to be routed indefinitely amongst the various devices handling the calls, as conventional systems do not always account for message looping. Currently, there is no convenient and reliable way in which to extend the services or features of network systems that support telephony, VoIP and other applications.

SUMMARY OF THE INVENTION

The invention presents a system for conveniently extending the capabilities of network systems that support telephony, VoIP and other applications capable of communicating over a network. This includes network systems and devices that process messages conforming to the SIP protocol, and other common network protocols. Also, the present invention relates to a method and system for preventing message looping within such network systems and devices.

In accordance with an embodiment of the invention, a network device having one or more executable service modules receives a message directed to a second device from a first device. Each of the one or more service modules comprises instructions for performing a specific service, such as message or call routing, media relaying, or other multimedia and telephony services. The message sent by the first device is created according to a common network protocol for supporting network telephony such as SIP. When a network device, such as a proxy server, receives the message, it passes the message up the corresponding protocol stack of the server, and eventually to a set of internal components that also facilitate the processing of the message. These components, which are configured specifically for operation upon the network device, include a dispatcher and a state manager. The dispatcher and state manager components interact with the one or more service modules to handle the message.

The dispatcher component analyzes the various data fields that comprise the message, and compares its contents to a set of resource data contained within a dispatching table. Resource data, which is stored in the dispatching table by the service modules as they are activated upon the server (e.g., via a registration process), includes any data that identifies the type of messages or events that the one or more modules are interested in. The resource data can also specify criterion for which a service module will perform its service for a given request. So, for example, one service module may only be interested in messages that are addressed to a specific network location or device, while another service module may be interested in messages addressed to any location or any device. The dispatcher checks the dispatching table to determine which of the one or more service modules is to process the message, and then delivers the message to the appropriate module(s) in which to be serviced (e.g., route the message to a destination, authenticate the message). During the time of processing, the dispatcher can activate the state manager so that it maintains state information pertaining to the message. Once the appropriate service module processes a message, that service module sends the message back to the dispatcher, which in turn determines if there is another service module that the message needs to be processed by. When the message does need to be serviced by another service module, the dispatcher passes the message to that particular service module. When no other processing need be performed on the message, the message is transmitted to the second device, or its intended destination.

In accordance with another embodiment of the invention, a network system, such as a proxy device, executes logical functions that prevent message looping from occurring between one or more executable service modules. Specifically, the one or more modules are activated upon the server via a registration process, and classified into three message handling categories, namely: (1) incoming-processing, (2) routing-processing, and (3) outgoing-processing. Service modules classified as incoming-processing handle messages passed up the protocol stack of the server, such as those newly received from a remote device. The processing performed on a received message by these modules generally includes information collection, the checking of message content, and other initialization and organization tasks (e.g., performing login access or message filtering).

Service modules classified as routing-processing generally make routing decisions, and so can change the destination address specified in a message if necessary. In general, only routing-processing type service modules are capable of making routing decisions. The dispatcher executes logical operations to prevent the dispatcher from dispatching the message to the same routing-processing service module that has previously processed the message. And lastly, service modules classified as outgoing-processing sit on the send path after the core routing routines. Modules in this category generally have knowledge of where the message is to be directed, and can modify the headers and message body accordingly. Typical service modules in this category may include logging, media relay or firewall control modules.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 is a block diagram illustrating steps executed in an embodiment of the invention for processing a message newly received by the proxy device of FIG. 3.

DETAILED DESCRIPTION OF THE INVENTION

The present invention relates to a system for conveniently extending the capabilities of network computing systems that support telephony services. Network computing systems suitable for practicing the invention include server devices, workstations, and any other computing devices capable of processing messages conforming to a protocol that facilitates network telephony. Such protocols include the Session Initiation Protocol (SIP), the H.323 protocol, the Single Computer Telephony Protocol (SCTP) and other protocols. Throughout the course of the detailed description, the invention will be described with general reference to SIP as a messaging protocol for supporting communication between devices in accordance with the teachings of the invention. However, those of skill in the art will recognize that SIP is only one protocol suitable for supporting network telephony, and that other protocols such as those disclosed above could just as easily be utilized. The invention is not limited to any one protocol, as any means or medium through which two or more devices may communicate to support network telephony is suitable.

As used herein, the term "network telephony" relates to any process wherein a network, such as the Internet, is used as a transmission medium for placing telephone calls or facilitating multimedia sessions between two or more computing devices. This can include multimedia sessions where streaming media (e.g., audio and video data) is exchanged over the network, conference calls, virtual meetings, and other telephony sessions. It will be recognized by those skilled in the art that the term "network telephony" is generic, and can therefore describe or pertain to several other communication processes involving the exchange of high scale data. These include, but are not limited to, IP telephony, Voice over the Internet (VOI) and Voice over IP (VoIP). Also, as used herein, the term "call" (e.g., telephone call) relates to a session in which an exchange of information is commenced or initiated between two or more devices over a network, such as with the aide of a telephony application (e.g., MICROSOFT NetMeeting™). In the context of the present invention, a "call" is synonymous to a "message" being sent between the devices. As such, the following description will use the terms call and message interchangeably at times to describe the interaction between two or more devices over the network.

Figure 1:
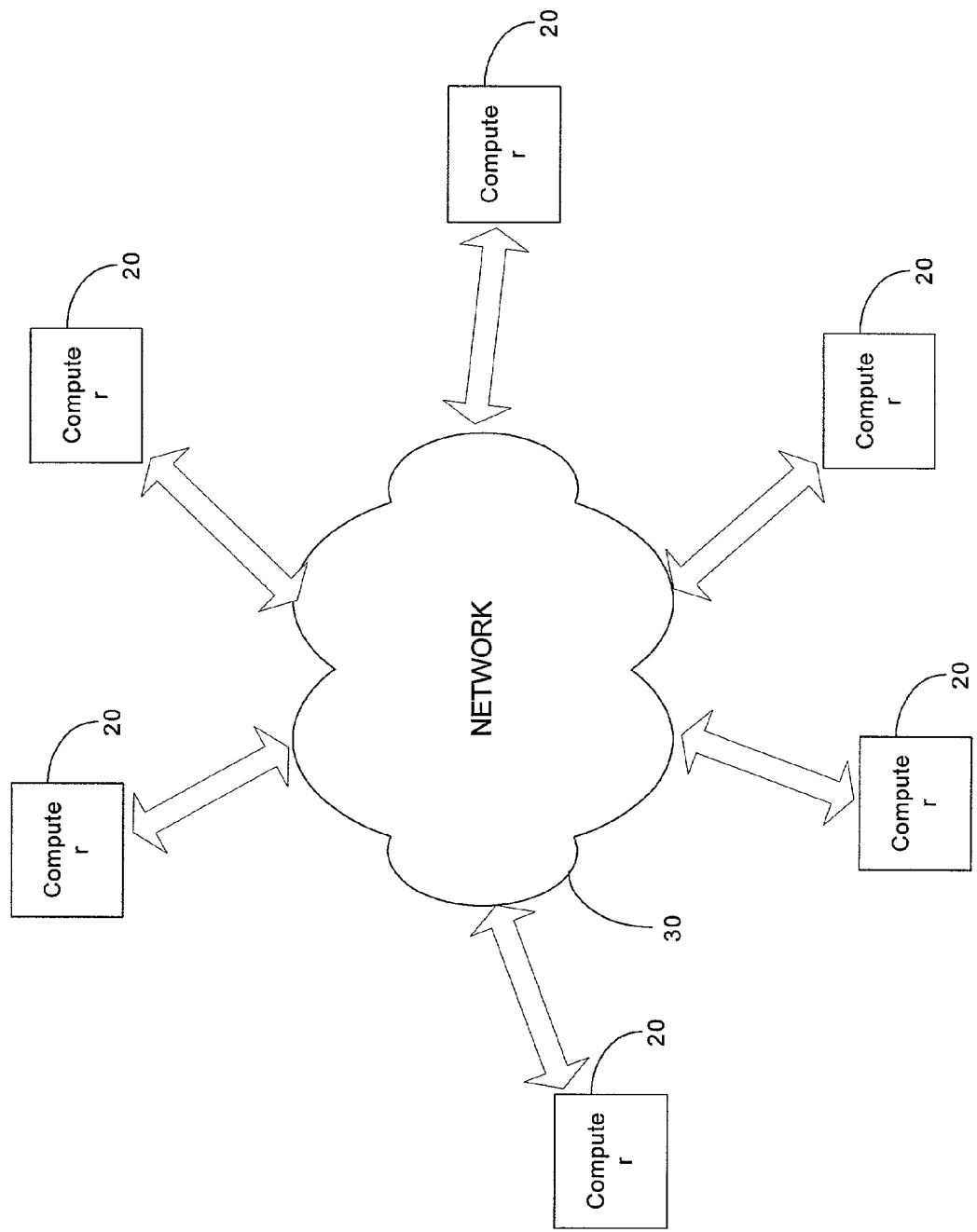
FIG. 1 is an example of a computer network.

An example of a networked environment in which the invention may be used will now be described with reference to FIG. 1. The example network includes several computers 20 communicating with one another over a network 30, such as the Internet, as represented by a cloud. Network 30 may include many well-known components, such as routers, gateways, hubs, etc. and may allow the computers 20 to communicate via wired and/or wireless media.

Figure 2:
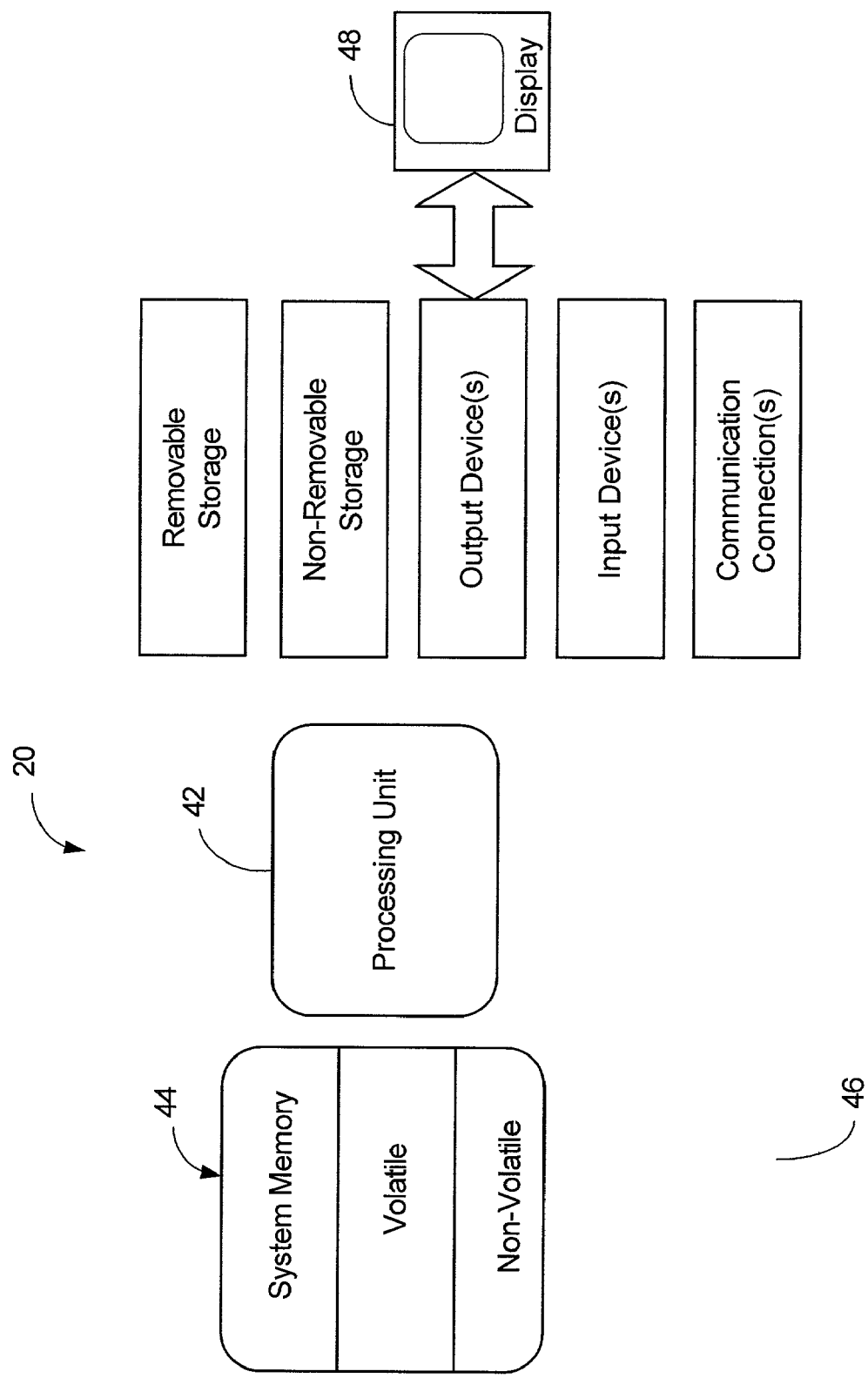
FIG. 2 is an example of a computer.

Referring to FIG. 2, an example of a basic configuration for a computer on which the system described herein may be implemented is shown. In its most basic configuration, the computer 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computer may also have other features/functionality. For example, computer 20 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 20. Any such computer storage media may be part of computer 20.

Computer 20 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 20 may also have input devices such as a keyboard, mouse, pen, voice input device, touch input device, etc. Output devices such as a display 48, speakers, a printer, etc. may also be included. All these devices are well known in the art and need not be discussed at length here.

Figure 3:
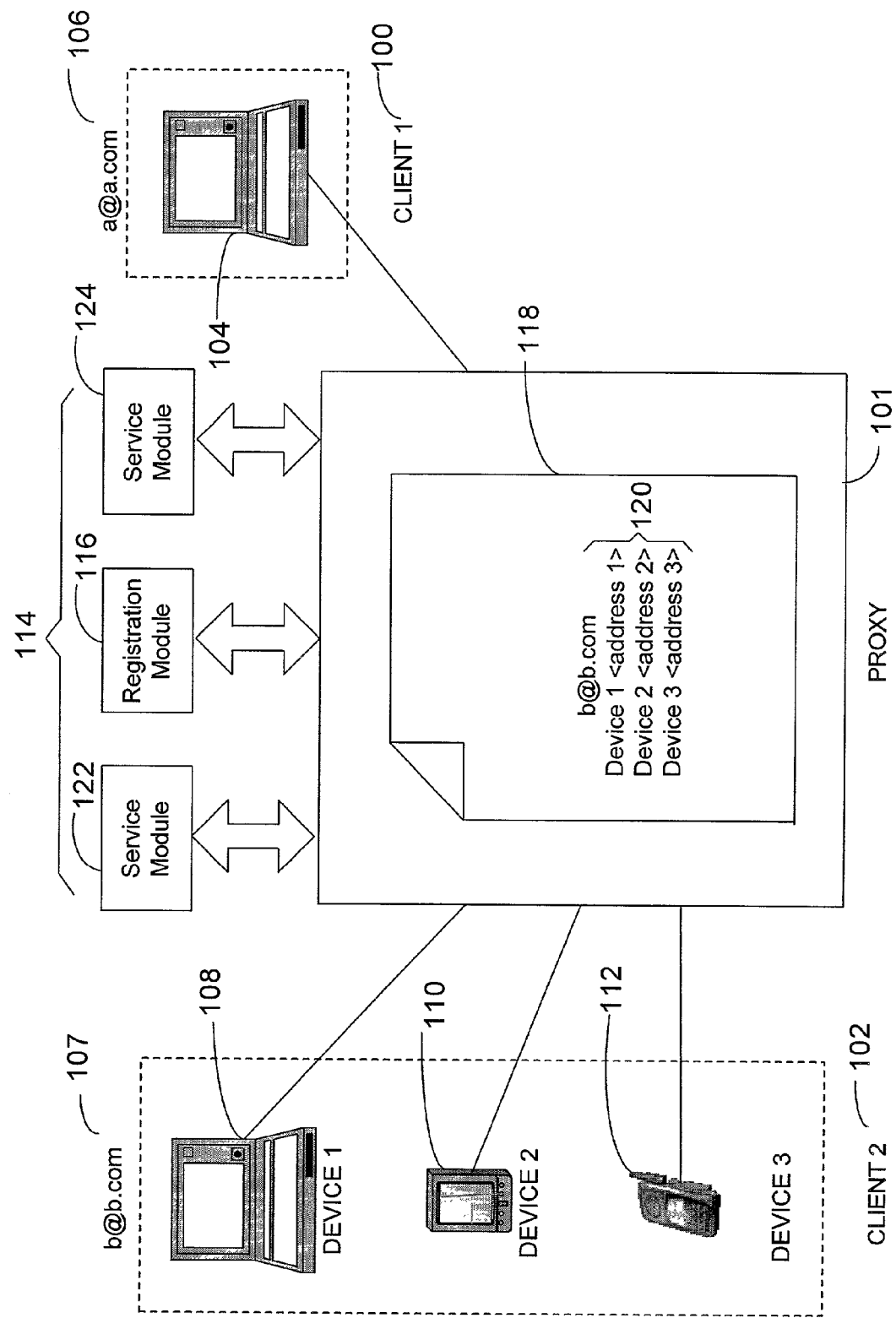
FIG. 3 is a diagram illustrating a proxy device facilitating a call between a first client and a second client over the network in accordance with an embodiment of the invention.

In an embodiment of the invention, a proxy device 101 having several executable service modules 114 facilitates a communication session between a first client 100 and a second client 102, as illustrated in FIG. 3. The first client 100 communicates over the network using a laptop computer 104, and is addressed according to the network location a@a.com 106. Hence, a device wishing to communicate with the first client 100 would reference the a@a.com network location. Contrastingly, the second client 102 communicates over the network using several devices, including a laptop computer 108, handheld device 110, and a cell phone 112. These devices are labeled Device 1, 2 and 3 respectively for convenient reference. All of the second client's devices are configured to the network according to the same address, or alias, namely b@b.com 107. As such, it is possible for the first client 100 to communicate with one, two or all of the possible devices available to the second client 102 by referencing a single address.

The factors and conditions that determine which particular device is the primary device for receiving a call, or other logical conditions that affect the behavior and nature of the communication, are established according to specific rules, or policies. For example, if the second client 102 wishes to be contacted only by cell phone after 5:00 P.M., but by e-mail via the laptop prior to this time, the client 102 sets these conditions accordingly. Commonly, the client sets such conditions or preferences with a telephony application that has a rules wizard, or policy setup feature. Alternatively, the network administrator of the b.com network upon which the second client 102 is configured can establish specific rules and policies for registered devices. Regardless of how these conditions are implemented, they are maintained and administered by the proxy device 101.

The proxy device 101 is a computing device, such as a server, that comprises one or more executable modules, referred to as service modules 114. The service modules 114 are implemented according to a standard programming language such as C or C++, Jscript, or any other machine executable language. Moreover, they may be implemented as dynamic link libraries (DLLs), or any other executable program objects. The proxy device 101 executes the service modules in order to provide extended message handling capabilities—beyond its normal range of capability—for managing and processing calls on behalf of one or more devices (e.g., the second client's devices). For example, the proxy device 101 may be equipped with a service module for performing call routing, one for automatically responding to incoming messages or calls, and perhaps another for executing specialized scripts or applications. Any set of instructions specified by a service module that is compatible with the methods and procedures of the operating system of the proxy device 101 and internal components of the network device (to be discussed later) can be executed.

Those skilled in the art will appreciate that the ability to invoke service modules for performing specialized or general call handling services dismisses the need for separate devices performing each function, as in conventional network systems. So, as an example, rather than provide call routing capabilities via a dedicated "call-routing" server, this functionality can be implemented as a call-routing service module that operates upon the proxy device 101 itself. Likewise, as long as the service modules comply with the processing mechanisms of the proxy device 101 (e.g., OS APIs) they can be customized to suit individual user needs. Hence, service modules for performing various tasks can be added to the proxy device 101 or adapted as needed to provide different functionality for the proxy device 101.

One example of a service module that is executable by the proxy device 101 is the registration module 116. The proxy device 101 uses the registration module 116 to register clients (and their corresponding communication devices) that wish to be processed by a particular service module or that wish to have their calls managed by the proxy device 101. In the illustrated embodiment, the second client 102 is registered with the proxy device 101 so that Devices 1, 2 and 3 are managed. The registration entries are maintained as a list, or database entry 118 by the registration module 116 on the proxy device 101. Entries include the alias of the second client 102, and its corresponding registered devices. Each device can be assigned its own distinct contact address 120, which can be a secondary address within the b.com network for communicating with the device.

Figure 4:
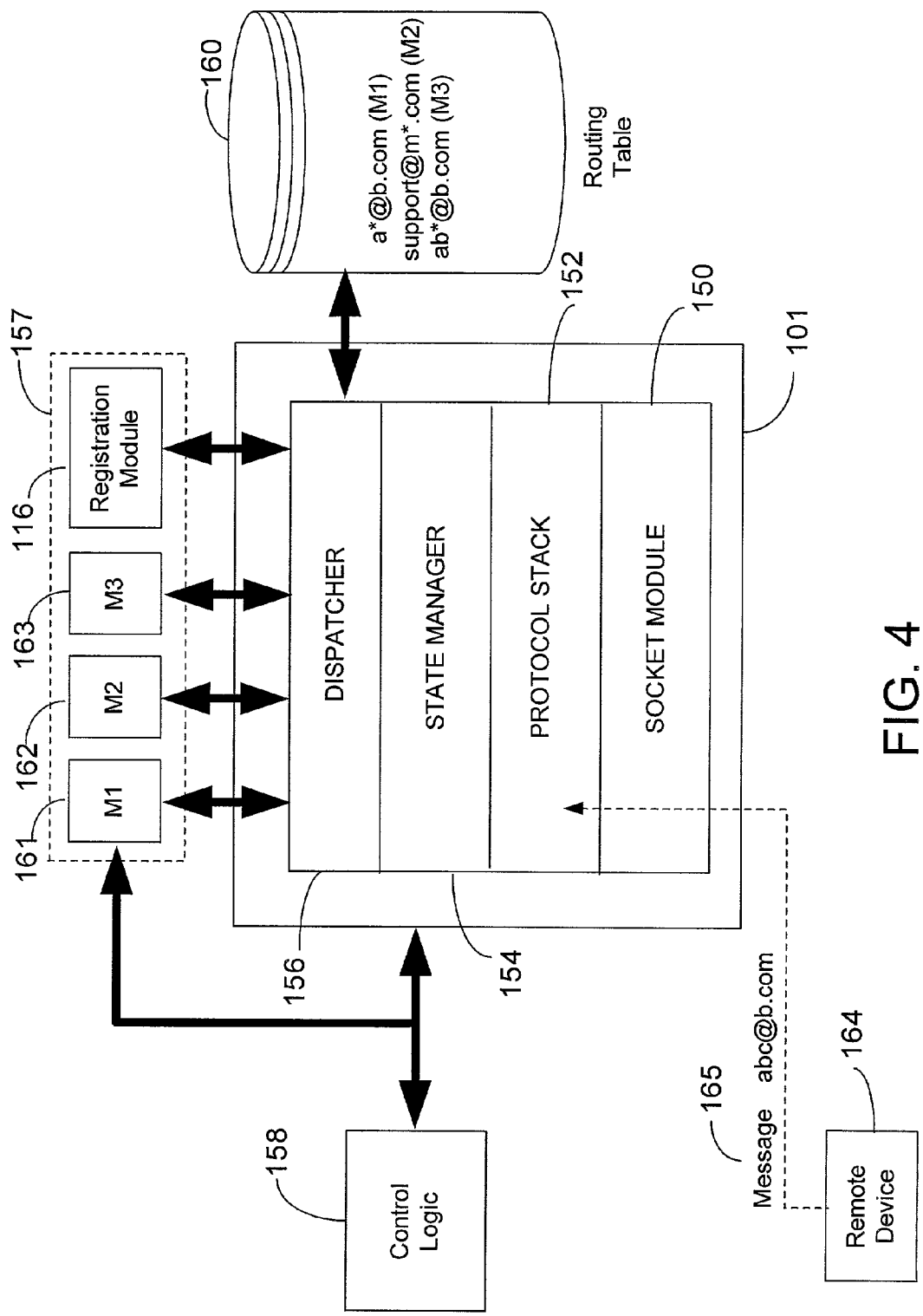
FIG. 4 is a diagram illustrating the internal architecture of the proxy device of FIG. 3 according to an embodiment of the invention.

In addition to the registration module 116, the proxy device 101 may also include other service modules that provide a particular service or function, such as modules 122 and 124. Again, the service modules can be customized to perform specific call or message processing tasks, making them suitable for implementation by a user of the proxy device 101, or even third-party module vendors. Each service module operating upon the proxy is assigned a unique identifier value, such as a GUID (group/user identifier), that identifies it from other service modules. Ideally, a service module is provided (e.g., by the user of the proxy device 101 or a network administrator) for each feature that is to be implemented for managing calls. To support the operation of service modules upon the proxy device 101, a system architecture for the proxy device 101 is presented in accordance with an embodiment of the invention. This architecture is illustrated by way of FIG. 4.

As shown, the internal architecture of the proxy device 101 is comprised of various internal components that perform different operations. One of the components is a socket module 150, such as Winsock (WINdows SOCKets). The socket module (well known in the art) is a common application programming interface (API) that facilitates communication between an application that operates on the proxy device 101, and the underlying communication protocol being used. Another component that comprises that internal architecture of the proxy device 101 is the protocol stack 152. The protocol stack provides the mechanisms for supporting communication upon the proxy device 101 in accordance with a particular control protocol. In the illustrated embodiment, the protocol stack is presented as an SIP stack for implementing SIP processing and control. Common SIP protocol stack features include timing management, transport control, data maintenance, and other mechanisms. While shown in the illustrated embodiment, the actual implementation of the SIP stack is beyond the scope of this description, and is therefore not detailed here. Those having skill in the art will recognize, however, that various means exist for implementing a protocol stack, and that any means by which the mechanisms necessary for supporting SIP communication is enabled upon a device is within the scope of the invention.

In addition to the socket module 150 and protocol stack 152, a state manager component 154 also operates upon the proxy device 101 for maintaining state information. State information is any data that is descriptive of, or associated with a particular transaction performed or call processed by the proxy device 101. The state manager 154 generates the state information based on observations of the message traffic by the proxy device 101. Based on the content of data within the message, the state manager 154 generates an event (e.g., flag) that indicates what type of processing is being performed on the message, and what is occurring with respect to the transaction (e.g., call active, transaction finished). This event, together with the message that triggered the event, is then delivered to any service modules indicating an interest, via a dispatching table 160, of such events and messages. The dispatching table 160, and its usage with respect to the service modules 116 and 161-163, will be described in a later section of the detailed description.

Those skilled in the art will recognize that several methods exist for maintaining state information during a communication process, and that the invention is not limited to any one mechanism. Indeed, the state manager 154 can maintain any information that is useful for providing an indication of the conditions or properties associated with a particular communication process.

Another internal component of the proxy device 101 is the dispatcher 156. The dispatcher 156 is an executable component that communicates directly with the one or more service modules 157 that are executed by the proxy device 101 for servicing calls. It communicates with the modules via standard method or system calls, such as API functions and routines. The dispatcher also builds up the process chain for messages received by the proxy 101, thus ensuring that the messages are serviced in the correct order. Still further, the dispatcher 156 also maintains resource data related to each service module. Resource data is information provided by each service module to specify the message or call types that the module is interested in processing. Moreover, resource data also specifies the service or processing task that is offered by a particular service module. The submission of this data to the dispatcher 156 allows a service module to register its services with the proxy device, thus enabling its unique mechanisms. In general, resource data can be any information that has an identity, including an electronic document, an image, a service, or a collection of other resources.

It is also worth noting that the extension modules specify, at the time of their registration (described later in this document), what state information they will be interested in during its operation. Only those messages that match the module's expressed interest will trigger creation of the state within the State Manager. If no extension module needs state for a message, no state will be created. This dynamic approach to state management allows for more effective resource management and better performance.

When the service modules are powered up, such as by a power management or control logic component 158, the modules pass resource data to the dispatcher 156. Data can be passed to the dispatcher in various forms, including in the form of a request uniform resource identifier (URI) via a standard method call or API procedure. A request URI is a simple stream of data that indicates a particular resource to be processed by a server, or that identifies a specific entity operating upon the network. Common examples of request URIs include uniform resource locators (URLs), which identify a particular web page or network document, and usernames associated with network computing device users. URIs within messages conforming to the SIP protocol specify a particular action or method to be performed in association with the message, such as "INVITE" for inviting a caller, or "REGISTER" for initiating the registration of a device. The dispatcher 156 then stores the resource data specified by the URI into a dispatching table 160 for subsequent retrieval.

In the illustrated embodiment, resource data is shown as being stored within the dispatching table 160 in connection with service modules 1-3; 161-163 respectively. Specifically, service module 1 (M1) passes resource data to the dispatcher indicating that it is interested in servicing messages addressed by, or to, a*@b.com, where * is a wildcard indicator. Similarly, module 3 (M3) specifies that it is interested in servicing messages addressed by, or to, ab*@b.com. Still further, module 2 (M2) indicates its preferred resource to be any device addressed by, or to, supportdesk@company.com. Because the dispatcher 156 stores the URIs for each module in the dispatching table 160, it can refer to the table in order to "dispatch" incoming calls or messages received by the proxy device 101 to the appropriate module for processing. For example, if a message 165 referencing abc@b.com is received from a remote device 164 by the proxy device 1101, this message is passed up the socket module 150 to the protocol stack 152, and eventually to the dispatcher 156. After some initial processing of the message is performed (as described in subsequent paragraphs), the dispatcher 156 checks the dispatching table 160 to determine which modules, if any, have resource data stored in the dispatching table 160 that matches the address specified in the message. In this case, modules M1 161 and M3 163 indicate resource data that matches the abc@b.com reference, so both modules must process the message. The decision as to which module is to process the message first, however, is determined according to a priority value associated with each module.

The priority value is simply a unique identifier, such as a numeric character, that is designated by each service module for itself as it registers with the dispatcher 156. Alternately, the dispatcher 156 may assign a unique priority value to each service module that registers its services with the proxy device 101. When the dispatcher 156 assigns the priority value itself, it ignores the recommendation made by the service module. Each module is assigned a specific priority value, but none of them are made aware of their priority with respect to other service modules. Only the network administrator of the proxy device 101 can access and modify the priority value information of a specific module once it has been assigned; which can be useful for further stream-lining the call management process.

Figure 5:
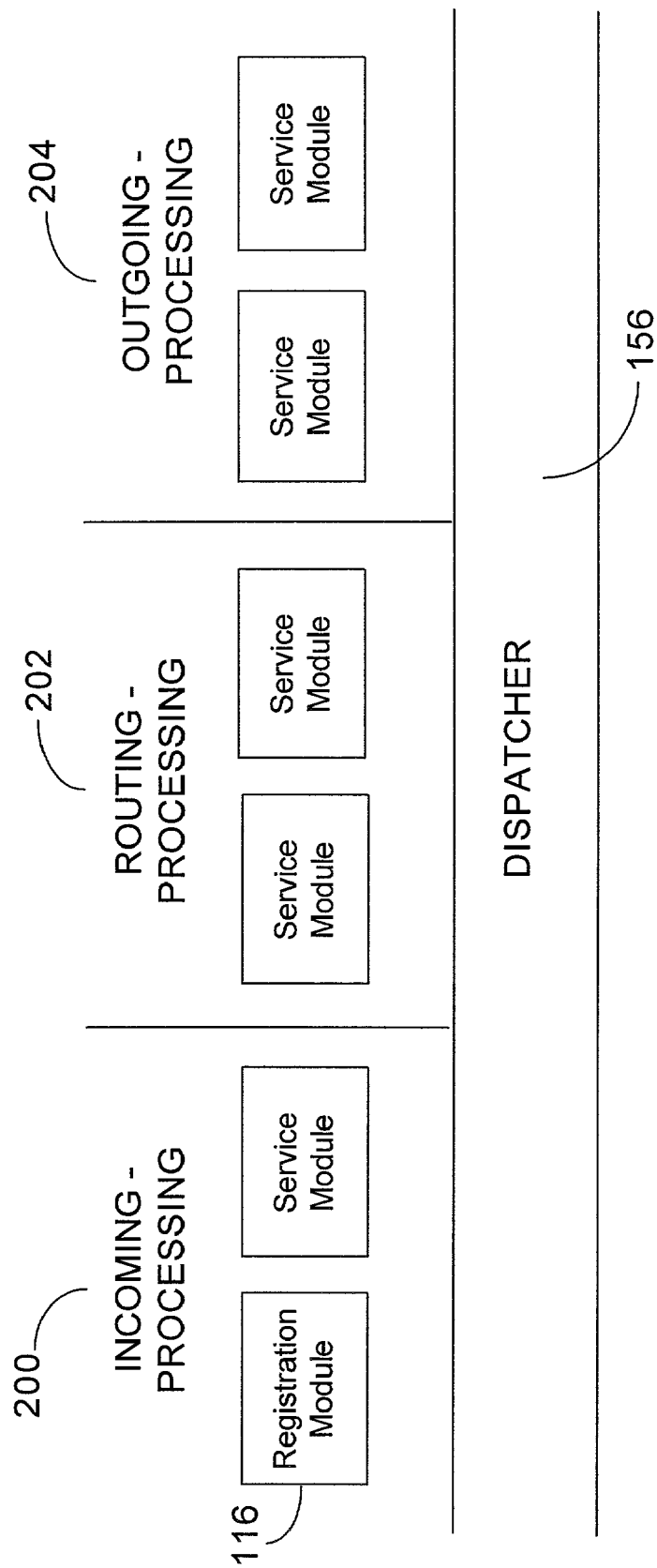
FIG. 5 is a block diagram illustrating a general classification of service modules in accordance with an embodiment of the invention.

In addition to associating a priority value with each service module, the proxy device 101 must be able to perform other mechanisms for ensuring the execution of service modules. Given that several service modules may be executed by the proxy device 101 for servicing a call, the proxy device must be able to effectively control the flow of a message as it is passed to various service modules from the time it is received, to the time it is transmitted to its intended destination. Furthermore, because one or more service modules may be capable of dictating the way in which a message is to be routed (e.g., changing the destination address specified in a message header), a control mechanism for preventing message looping is necessary. To accommodate these requirements, the proxy device 101 executes a message-handling scheme in accordance with an embodiment of the invention. This message-handling scheme is detailed in the following paragraphs, and illustrated by way of FIG. 5.

With respect to the figure, the one or more service modules executed by the proxy device 101 are classified into three message handling categories, namely: incoming-processing 200, routing-processing 202, and outgoing-processing 204. When the service modules register with the proxy device 101 by passing its resource data to the dispatching table 160, it denotes its classification. Each classification relates to the functionality of a service module as it processes a call. In particular, service modules classified as incoming-processing 200 process incoming messages, or those that are newly received by the proxy device 101 (e.g., passed up the protocol stack to the dispatcher 160 from over the network). These modules generally perform information collection, check message content, and perform other initialization and organization tasks. Examples of modules in this category include a login access service module, an error correction module, or a service module that performs message filtering (e.g., altering various message headers as needed). Also included in this category is the registration module 116, which facilitates the enabling of one or more devices that wish to be managed by the proxy device 101. Incoming-processing service modules operate within the receive path of an incoming message. For this reason, the dispatcher 160 dispatches any newly received messages to the appropriate incoming-processing modules before any other module types. The appropriate service module for receiving the message is determined by the dispatcher by checking the resource data specified in the dispatching table 160.

After being processed by the appropriate incoming-processing module(s), state information can be stored by the state manager 154 at the discretion of the processing service module. The message is then passed back to the dispatcher 160. Depending on the type of action specified within the message (e.g., "INVITE", "REGISTER"), or the type of service that is to be performed by the proxy device in managing the call, the dispatcher 160 forwards the message to the routing-processing 202 or outgoing-processing 204 modules. Generally, modules within the routing-processing 202 category process messages requiring call routing or message redirection. Modules in this category make routing decisions, and so can alter the intended destination of a message if necessary. For example, a message addressed to a device originally referenced by abc@b.com can be redirected by a routing-processing module to xyz@b.com, the new reference location (URI) of the intended device. As another example, a routing-processing module can reroute a call from the destination of an inactive device, to that of an active device. Only modules classified as routing-processing 202 are capable of altering or determining the next hop a message is to take. For SIP messages, this means that routing-processing modules are capable of making "next-request-URI" decisions by providing a new Request-URI, or by maintaining the URI specified in the original message. Routing-processing modules do not directly modify the content of SIP messages, as they are focused on making routing decisions.

Examples of service modules within the routing-processing message handling category include, but are not limited to: a call routing module, a registration database query module, and application module, and a dispatching table lookup module. An application module can be used by the operating computing device, such as a proxy, for executing specialized scripts or executable applications for call processing. Also, a registration database query module performs queries of the list of service modules and devices that are registered with the proxy device 101. It retrieves the contact information pertaining to the device, or unique GUID of the service module, and returns this value to the requesting device or module. Similarly, a dispatching table lookup module is used in connection with the dispatching table 160 maintained by the dispatcher 156. This service module performs queries of the dispatching table 160, and retrieves the resource data pertaining to the one or more service modules that are registered with the proxy device 101. Other service modules for executing specialized tasks may be implemented as well.

Finally, service modules classified as outgoing-processing 204 sit within the send path of a message after the initialization/configuration and core routing routines have been performed. These modules are able to access the state manager 154 or query the dispatching table 160 (e.g., via a dispatching table lookup module) for information pertaining to where the message is to be directed. This includes information such as the next hop location, or the next-request-uri value. When an outgoing-processing type service module directs a message in accordance with the next hop information (which means that the current request-uri will be the final one in the outgoing message), it does not make any modification to the request-uri value. As necessary, however, outgoing-processing modules can modify the message headers and message body accordingly. Typical service modules in this category include a media relay service module for the adaptation of telephony data for various transmission mediums, or a firewall entry module for providing decryption/encryption or other network security services.

Figure 6:
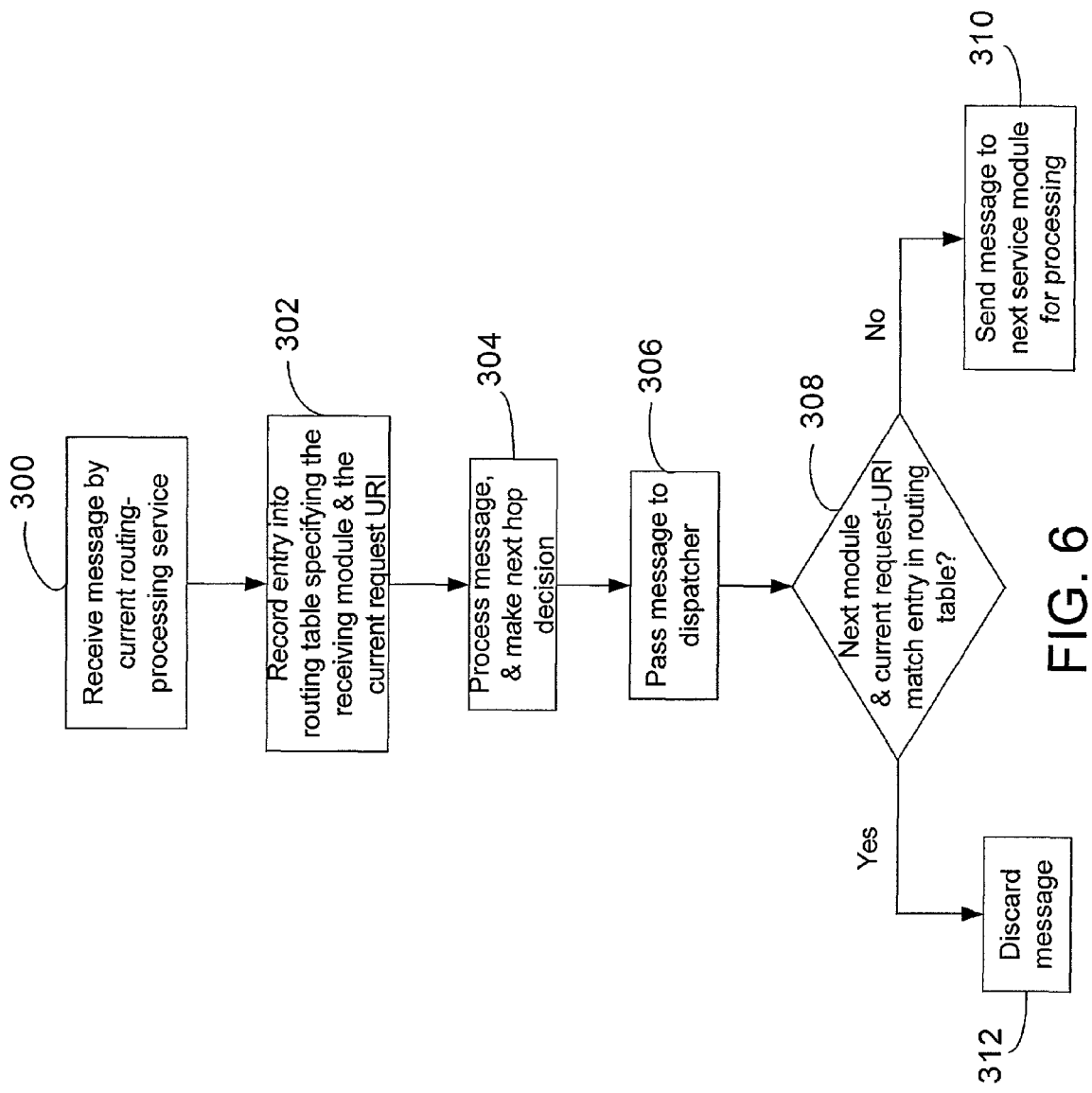
FIG. 6 is a flowchart illustrating steps executed in an embodiment of the invention for preventing message looping during the handling of a message by the proxy device of FIG. 3.

As discussed previously, only the routing-processing modules 202 are capable of making routing decisions. Because of this functionality, it is possible for service modules of this type to route messages to one another indefinitely. For example, if a first routing-processing service module designates the next hop of a message as the location of a second routing-processing service module, the second routing-processing module should not route the message back to the first routing-processing service module. Otherwise, the result is a rerouting of the message back to its previous location—the first routing-processing module. Those skilled in the art will recognize that this phenomenon is common in some conventional network telephony systems, and can cause significant delays in message processing and transmission. To prevent messages from being routed or redirected indefinitely (or infinitely) as a result of processing, a means for preventing message looping is necessary. In accordance with an embodiment of the invention, the dispatcher 156 of the proxy device 101 executes loop prevention logic in connection with the operation of the routing-processing service modules 202, as illustrated in the flowchart of FIG. 6.

As shown, when a message is passed to a current service module classified as routing-processing 202 for processing (event 300); the service module records an entry specifying the module's unique identifier value and the current Request-URI into the dispatching table (event 302). This message is then processed by the service module (event 304)—resulting in the next hop decision being made—and passed to the dispatcher 156 to be directed to the next routing-processing service module (event 306). Before passing the message to the next routing-processing service module for processing, the dispatcher 156 checks the dispatching table 160 to determine if the unique identifier value of the next module and the current Request-URI match an entry already included within the dispatching table 160 (event 308). When this condition is false, the message is passed to the next module for processing accordingly (event 310), and the process is repeated. However, when the unique identifier value of the next module and the current Request-URI match an entry within the dispatching table, the dispatcher 156 discards the message in order to prevent the message from being processed by the same service module (event 312). More specifically, the dispatcher 156 ensures that no service module is capable of processing the same message more than once, thus preventing indefinite looping within the proxy device 101.

Up to this point, the invention has been described with respect to the various modules that comprise the system architecture of a proxy device. This includes the modules that ensure the passage of messages from the network transmission wire (socket module, protocol stack), all the way up to the service modules that execute at higher levels of the proxy device 101. Also, the various message handling categories used to specify the operation of the service modules upon the proxy device 101 have been described. Still further, the logical operation performed by the dispatcher 156 for preventing message looping has been presented in accordance with an embodiment of the invention. In an effort to better describe the present invention, the interaction between the various modules that comprise the system architecture of the proxy device 101 will now be described in the following paragraphs.

According to an embodiment of the invention, calls are received and serviced by a proxy device 101 having one or more service modules that perform specific tasks, as illustrated in the flowchart of FIG. 7. A first client 500 places a call to a second client 502 whose calls are managed by the proxy device 101 (event 604) over a network 503. The socket module of the proxy device 101 receives the call from over the wire, and passes it to the protocol stack 152. The message is processed (e.g., parsed) by the protocol stack module 152, and then passed up to the state manager 154 and eventually the dispatcher 156 (events 606-610). When the dispatcher receives the message, it checks the message against resource data stored within the dispatching table 160 to determine which module is to receive the message (event 612). As discussed previously, the first modules to process any newly received message are the incoming-processing modules 200. Consequently, the dispatcher 156 dispatches the message to a service module of this type having matching criteria, and the message is then processed (event 614). Once the message is processed, it is passed back to the dispatcher 156 (event 616), and another decision as to which module is to receive the message is made via the dispatching table (event 612). Optionally, the service modules may store state information by communicating with the state manager 154. Any data requested by a service module for storage is maintained in a location accessible by the state manager.

In the absence of any other incoming-processing service modules 200 that need to process the message, the dispatcher 156 determines which routing-processing 202 or outgoing-processing 204 service modules are to receive the message. This decision is due in part to the resource data indicated within the dispatching table 160, as well as the particular functionality required for servicing the message (call). For example, the message may require call-routing services, in which case a call routing service module is appropriate for this task, and thus receives the message prior to any outgoing-processing service modules. In the illustrated embodiment, the message is dispatched to a first service module 517, processed, and then passed back to the dispatcher 156 (event 618). From there, it is dispatched to a second routing-processing service module 519 and, processed, and then passed again to the dispatcher 156 to determine the next service module in which it is to be processed by (event 620). The dispatcher 156 passes the data to the appropriate outgoing-processing service module 521 to be processed (event 622), and directed to its intended destination (e.g., next-request-uri). Upon processing the message, it is passed one last time to the dispatcher (event 624), through the other modules, and eventually placed onto the network 503 to its destination (event 626). The intended destination—the second client device 502—receives the processed message accordingly (event 628).

Those skilled in the art will appreciate that virtually any service, procedure, or function that affects or alters the behavior and nature of a communication between devices that support network telephony can be implemented as a service module. The ability to invoke service modules for performing specialized or general call handling services, such as in the illustrated embodiment of FIG. 7, dismisses the need for separate devices performing each function. While the concept of extending the capabilities of network telephony systems is not necessarily new, there are currently no convenient platforms or system architectures available for supporting the interoperability of service modules to extend the capabilities of existing systems. The present invention, however, allows service modules to be added to existing network telephony systems, such as a proxy devices, without any alterations to the proxy stack or operating system routines.

Also, because the service modules are implemented as software modules, no hardware reconfiguration or extensive APIs are needed to exploit their functionality. This significantly minimizes the overhead involved in extending the operation of a network telephony device, and supports the usage of third-party service modules. Moreover, because the service modules specify what state information they are interested in via the resource data, only those messages that match the module's expressed interest will trigger creation of the state by the state manager 154. This results in state information being created only when a service module requires it, and not for all calls or transactions. This dynamic approach to state management allows for more effective resource management and better performance.

While various illustrated embodiments show the proxy device as existing at a network location separate from the interacting client devices, the invention is not limited to any particular network configuration. Indeed, the invention is applicable to any network configuration, including those wherein the proxy device is located within the same network as the interacting devices. Furthermore, the invention can be implemented within both distributed and non-distributed environments. Any network system requiring appropriate mechanisms, functions and procedures for supporting telephony applications or devices can benefit from the invention.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for preventing message looping occurring during servicing of a message by a network device having a plurality of executable service modules for supporting network telephony, the message having a message type, the method comprising the steps of:
   for each of the plurality of executable service modules registering resource data, the resource data specifying one or more message types that the executable service module can process, each of the plurality of executable service modules having a unique identifier;
   for each of the plurality of executable service modules that process the message within the network device,
      recording an entry in a dispatching table for the message that specifies the unique identifier value assigned to a current executable service module that is processing the message, the entry also specifying the resource data related to the current executable service module in relation to the message, the dispatching table having an entry for each executable service module that has processed the message; and
      selecting by the current executable service module a next executable service module of the plurality of executable service modules that is to process the message, the selecting being based at least in part on a comparison of the message type of the message with the one or more message types that the executable service modules can process based at least in part on the registered resource data; and
      after selecting the next executable service module and before passing the message to the next executable service module,
         checking each entry of the dispatching table against the unique identifier value and associated resource data of the next executable service module to determine if the message has been processed by the next executable service module before;
         after determining that the message has been processed by the next executable service module, discarding the message; and
         after determining that the message has not been processed by the next executable service module, passing the message to the next executable service module for processing.

2. The method of claim 1, wherein the step of selecting includes processing the message according to the functionality of the current executable service module.

3. The method of claim 2, wherein the step of selecting includes routing the message to a routing-processing service module.

4. The method of claim 2, wherein the current executable service module is classified as a routing-processing service module.

5. The method of claim 1, further comprising:
   registering the plurality of executable service modules with the network device according to one of three types of call handling categories from the group consisting of incoming-processing, routing processing and outgoing-processing.

6. The method of claim 5, wherein the step of registering includes storing information identifying the classification of the plurality of executable service modules into the dispatching table.

7. A computer-readable storage device containing computer-executable instructions for controlling a computer to prevent message looping within a network device during servicing of a message by the network device having executable service modules, the message having a message type, the instructions implementing a method comprising:
   for each of the executable service modules registering resource data, the resource data specifying one or more message types that the executable service module can process, each of the executable service modules having a unique identifier;
   for each of the executable service modules within the network device that is passed the message,
      recording by a current executable service module currently processing the message an entry in a dispatching table for the message that specifies the unique identifier value assigned to the current executable service module, the dispatching table having an entry for each executable service module that is passed the message;
      retrieving state information associated with the message;
      processing by the current executable service module the message;
      updating the state information in the dispatching table based on the processing so that the updated state information is available to other executable service modules;
      selecting, by the current executable service module, a next executable service module of the executable service modules that is to process the message, based on a comparison of the message type of the message with the one or more message types that the executable service modules can process based at least in part on the registered resource data;
      before passing the message to the next executable service module, checking entries of the dispatching table against the unique identifier value of the next executable service module to determine if the message has already been processed by the next service executable module;
      when the message has already been processed by the next service executable module, discarding the message without passing the message to the next executable service module; and
      when the message has not yet been processed by the next executable service module, passing the message to the next executable service module for processing.

8. The computer-readable storage device of claim 7, wherein the selecting includes processing the message according to the functionality of the current executable service module.

9. The computer-readable storage device of claim 8, wherein the selecting includes routing the message to a routing-processing module.

10. The computer-readable storage device of claim 8, wherein the current executable service module is classified as a routing-processing module.

11. The computer-readable storage device of claim 7, further comprising:
    registering the executable service modules with the device according to one of three types of call handling categories from the group consisting of incoming-processing, routing processing, and outgoing-processing.

12. The computer-readable storage device of claim 11, wherein the registering includes storing information identifying the classification of the executable service modules into the dispatching table.

13. A network device for preventing message looping during servicing of a message within the network device, the message having a message type, the network device having executable service modules, the network device comprising:
- a memory storing computer-executable instructions of:
  - a component that, for each of the executable service module, registers resource data, the resource data specifying one or more message types of messages that the executable service module is to process, each of the executable service modules having a unique identifier;
  - a component that receives, by a current executable service module of the executable service modules, the message;
  - a component that records by the current executable service module within the network device in a dispatch table an entry that specifies the unique identifier value of the current executable service module and state information based on processing of the message by the current executable service module so that the state information is available to a next executable service module of the executable service modules that is to process the message, the dispatch table being shared by the executable service modules and having an entry for each executable service module that has received the message;
  - a component that selects by the current executable service module the next executable service module that is to process the message based on a comparison of the message type of the message with the one or more message types that the executable service modules can process based at least in part on the registered resource data;
  - a component that, before passing the message to the next executable service module, checks the dispatch table to determine whether an entry has been recorded that specifies the unique identifier value of the next executable service module;
  - a component that, upon determining that the dispatch table contains such an entry, discards the message without passing the message to the next executable service module; and
  - a component that, upon determining that the dispatch table does not contain such an entry, passes the message to the next executable service module for processing; and
- a processor for executing the computer-executable instructions stored in the memory.

* * * * *